(12) United States Patent
Mantor et al.

(10) Patent No.: US 9,529,632 B2
(45) Date of Patent: Dec. 27, 2016

(54) INTERLOCKED INCREMENT MEMORY ALLOCATION AND ACCESS

(75) Inventors: Michael Mantor, Orlando, FL (US); John McCardle, Indialantic, FL (US); Marcos Zini, Oviedo, FL (US); Brian Emberling, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1257 days.

(21) Appl. No.: 12/553,652

(22) Filed: Sep. 3, 2009

(65) Prior Publication Data

US 2011/0055511 A1    Mar. 3, 2011

(51) Int. Cl.
| | |
|---|---|
| *G06F 12/00* | (2006.01) |
| *G06F 13/00* | (2006.01) |
| *G06F 13/28* | (2006.01) |
| *G06F 9/50* | (2006.01) |

(52) U.S. Cl.
CPC .................. *G06F 9/5016* (2013.01)

(58) Field of Classification Search
USPC ................................ 711/102, 170
See application file for complete search history.

(56) References Cited

U.S. PATENT DOCUMENTS

| 5,706,515 | A * | 1/1998 | Connelly et al. ............ 718/106 |
| 6,950,107 | B1 * | 9/2005 | Moreton et al. ............ 345/543 |
| 7,865,485 | B2 * | 1/2011 | Mullick et al. ............ 707/704 |
| 2010/0287216 | A1 * | 11/2010 | Ylonen ........................ 707/813 |
| 2011/0050713 | A1 | 3/2011 | McCrary et al. |
| 2011/0055511 | A1 * | 3/2011 | Mantor et al. ................ 711/170 |
| 2012/0139930 | A1 | 6/2012 | Rogers et al. |

OTHER PUBLICATIONS

Office Action mailed Aug. 14, 2013, in U.S. No. 13/171,979, Rogers et al., filed Jun. 29, 2011.

* cited by examiner

*Primary Examiner* — Charles Rones
*Assistant Examiner* — Sidney Li
(74) *Attorney, Agent, or Firm* — Volpe and Koenig, P.C.

(57) ABSTRACT

A method of allocating a memory to a plurality of concurrent threads is presented. The method includes dynamically determining writer threads each having at least one pending write to the memory; and dynamically allocating respective contiguous blocks in the memory for each of the writer threads. Another method of allocating a memory to a plurality of concurrent threads includes launching the plurality of threads as a plurality of wavefronts, dynamically determining a group of wavefronts each having at least one thread requiring a write to the memory, and dynamically allocating respective contiguous blocks in the memory for each wavefront from the group of wavefronts. A corresponding method of assigning a memory to a plurality of reader threads includes determining a first number corresponding to a number of writer threads having a block allocated in said memory, launching a first number of reader threads, entering a first wavefront of said reader threads from said group of wavefronts to an atomic operation, and assigning a first block in the memory to the first wavefront during the corresponding atomic operation, where the first block is contiguous to a previously allocated block dynamically allocated to another wavefront from said group of wavefronts. Corresponding system embodiments and computer program product embodiments are also presented.

19 Claims, 10 Drawing Sheets

INTERLOCKED INCREMENT MEMORY ALLOCATION AND ACCESS

BACKGROUND OF THE INVENTION

1. Field of the Invention

The present invention relates generally to the use of memory by concurrently executing threads.

2. Background Art

Efficient memory allocation and access are important aspects in enhancing the performance of computer systems and applications. Application performance and overall system efficiency may decline, for example, when contention occurs in accessing memory for reading or writing, and/or when insufficient free memory remains in the system. When numerous concurrently executing processes or threads exist in the system, such memory issues become increasingly important.

Environments in which numerous concurrently executing processes or threads cooperate to implement an application is found, for example, in graphics processor units (GPU). GPUs are rapidly increasing in processing power due in part to the incorporation of multiple processing units each of which is capable of executing an increasingly large number of threads. In many graphics applications, multiple processing units of a processor are utilized to perform parallel geometry computations, vertex calculations, pixel operations, and the like. For example, graphics applications can often be structured as single instruction multiple data (SIMD) processes. In SIMD processing, the same sequence of instructions is used to process multiple parallel data streams in order to yield substantial speedup of operations. Modern GPUs incorporate an increasingly large number of SIMD processors, where each SIMD processor is capable of executing an increasingly large number of threads.

When a GPU processes an image, for example, numerous threads may concurrently execute to process pixels from that image according to a single instruction stream. Each pixel or group of pixels can be processed by a separate thread. Some instructions cause threads to write to a memory, other instructions cause threads to read from the memory, and yet other instructions causes no thread interactions with memory. Typically, respective threads that process pixels of the same image write to different areas of a predetermined memory area. Therefore, conventionally each thread is pre-configured, for example, at the time of its launching, with its own area of memory. Although fast, such pre-allocation can become highly inefficient as the number of concurrently executing threads or as the size of such pre-allocated memory blocks increase. For example, after a conditional branch instruction, when a only relatively small number of executing threads take the path of instructions to write to areas of pre-allocated memory, while a majority of the threads do not write to memory, only a few of the pre-allocated blocks would actually be used. The pre-allocated but unused areas of memory represent "holes" in the memory. For example, if each of 64 threads were allocated equal sized blocks of memory at thread launch and only two of those threads actually wrote to memory, then 62 of the pre-allocated blocks would be holes in memory. Such holes in the memory are detrimental to system performance: holes can cause other threads to fail in acquiring memory and also holes can complicate access to memory by threads. Conventionally, therefore, a separate process may continually monitor memory blocks to detect and eliminate such holes. However, such a separate process is inefficient due to a number of factors including the overhead of re-organizing memory and re-organizing any pointers to memory passed to threads.

Therefore, methods and apparatus are needed to efficiently allocate and use memory in environments such as data-parallel processing.

BRIEF SUMMARY OF EMBODIMENTS OF THE INVENTION

Embodiments of the present invention enable substantially improved utilization of memory resources in computing environments with multiple concurrently executing processes or threads. One embodiment is a method of allocating a memory to a plurality of concurrent threads. The embodiment includes: dynamically determining, from the plurality of concurrent threads, writer threads each having at least one pending write to the memory; and dynamically allocating respective contiguous blocks in the memory for each of the writer threads.

In another embodiment a method of allocating a memory to a plurality of concurrent threads includes: launching the plurality of threads as a plurality of wavefronts; dynamically determining, from the plurality of wavefronts, a group of wavefronts each having at least one thread requiring a write to the memory; and dynamically allocating respective contiguous blocks in the memory for each wavefront from the group of wavefronts.

In an embodiment of a method of assigning a memory to a plurality of reader threads, the method includes: determining a first number corresponding to a number of writer threads having a block allocated in said memory; launching a first number of reader threads; entering a first wavefront of said reader threads from said group of wavefronts to an atomic operation; and assigning a first block in the memory to the first wavefront during the corresponding atomic operation, wherein the first block is contiguous to a previously allocated block dynamically allocated to another wavefront from said group of wavefronts.

In a system embodiment of the present invention, a processor includes at least one data-parallel processor, at least one thread memory counter, and a compact memory allocator. The at least one data-parallel thread processor is configured to execute a plurality of concurrent threads. The at least one thread memory counter is coupled to the at least one data-parallel thread processor. The compact memory allocator is configured to: dynamically determine, from the plurality of concurrent threads, writer threads each having at least one pending write to a memory; and dynamically allocating, using the at least one thread memory counter, respective contiguous blocks in the memory for each of the writer threads.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF EMBODIMENTS OF THE INVENTION

Figure 1:
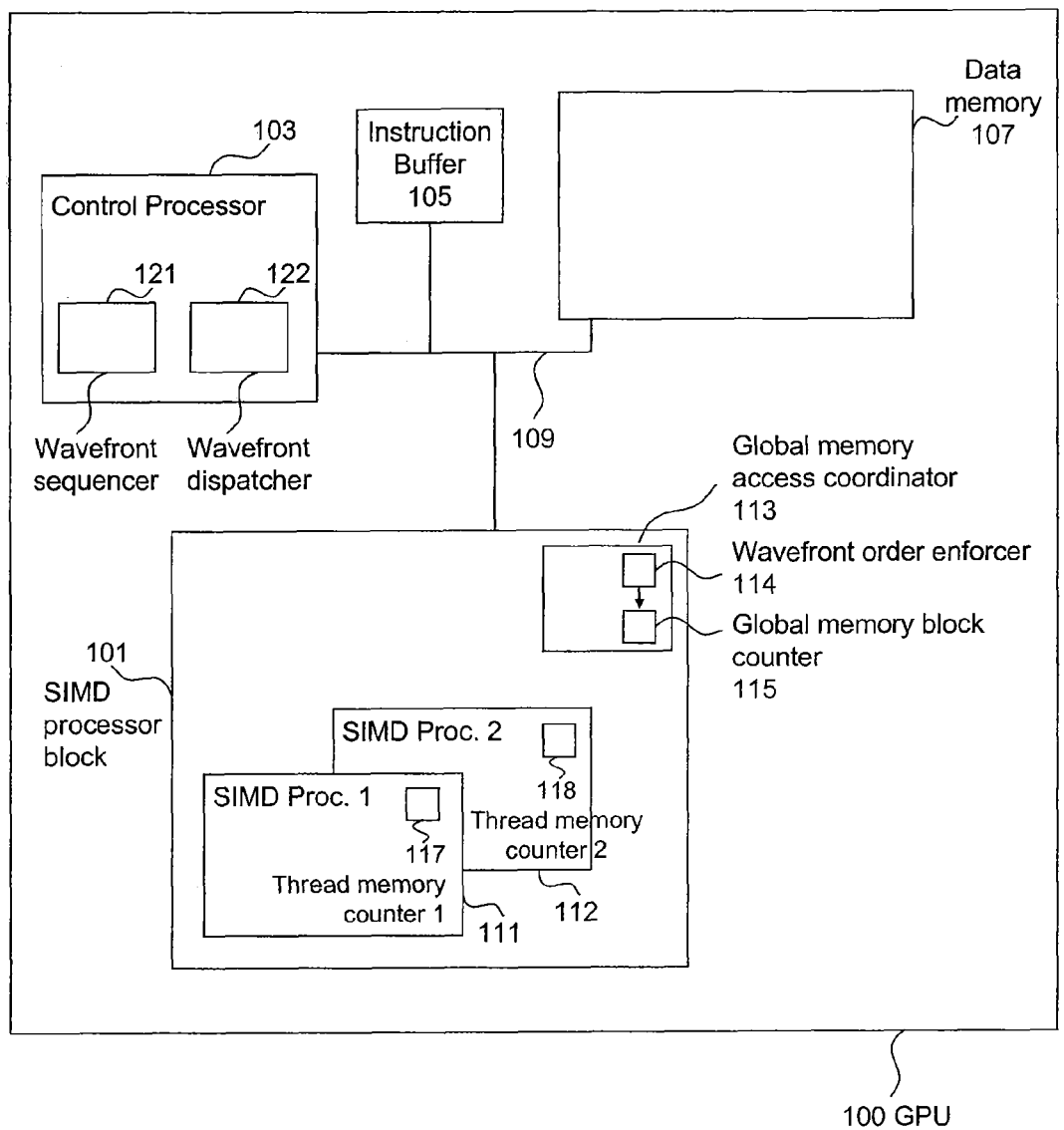
FIG. 1 illustrates a system for allocating memory to a plurality of concurrently executing threads, according to an embodiment of the present invention.

Embodiment of the present invention enable substantially improved utilization of memory resources in computing environments with multiple concurrently executing processes or threads. Graphics processor units (GPU), for example, can achieve substantial performance and efficiency gains from the present invention. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention improve system efficiency and application performance by providing methods and/or apparatus for enabling multiple concurrently executing processes or threads to write to and read from memory with increased efficiency. Whereas in conventional systems memory blocks are pre-allocated to threads, embodiments of the present invention dynamically identifies threads that actually write to memory and allocate memory only to those threads. Embodiments of the present invention also ensure that the memory allocated to threads are contiguous. By selectively allocating memory to only those threads that actually write to memory, and also by ensuring the allocation of contiguous memory, embodiments of the present invention enable substantially improved use of memory between concurrently executing threads. Embodiments of the present invention avoid holes in memory that, in conventional systems, cause inefficiencies due to unutilized memory and additional processing required to rearrange the memory to eliminate such holes. By subjecting threads to an interlocking process enforced by atomic operations in order to access and/or allocate memory, a fast, efficient, and reliable memory allocation and access system is achieved.

GPU environments in which numerous concurrently executing processes or threads execute to process data are particularly suited to benefit from the present invention. In embodiments of the present invention, memory wastage due to pre-allocation, in instances such as highly divergent branch instructions that occur in conventional systems, is avoided. The avoiding of such wastage can result in substantial improvements in application performance and system efficiency in GPU environments that have a high number of concurrently executing processes or threads. The present invention provides embodiments in which memory allocation and/or memory access can be for threads that have no ordering requirements as well as for threads that have ordering requirements. In typical GPU applications, such as the processing of pixels, although individual pixels can be processed in any order the blending of the image may require to be done according to some ordering of the pixels. The memory access methods and apparatus taught in this disclosure can be implemented in hardware, firmware, or software, or a combination thereof, to achieve the desired performance and scalability levels.

Apparatus for Compact Memory Allocation and Access

FIG. 1 illustrates a system or apparatus, according to an embodiment of the present invention that can be used for compact memory allocation and/or compact memory access. Herein, the term memory allocation is used in relation to writer threads, and the term memory assignment is used in relation to reader threads. It should also be noted that the terms thread and process are used interchangeably in describing the present invention. GPU 100 includes, but is not limited to, a SIMD processor block 101, a command processor 103, an instruction buffer 105, at least one data memory 107, and a communication infrastructure 109. In one embodiment, GPU 100 would be communicatively coupled to a computer system to assist the central processing unit (CPU) in the processing various tasks such as graphics processing or other tasks amenable to a high degree of parallel processing. In another embodiment, GPU 100 can be a general purpose GPU (GPGPU) either performing a multitude of different tasks as a co-processor of a CPU, or performing the functions of the CPU.

SIMD processor block 101 includes one of more processing units, such as single instruction multiple data (SIMD) processors 111 and 112. SIMD processor block 101 includes the functionality to perform various processing tasks on GPU 100. Each SIMD processor 111 and 112 is configured to execute one or more concurrent threads, each thread performing a part of the processing required for one or more tasks assigned to the SIMD processing block 101. For example, in an application rendering images to a display screen, each SIMD processor 111 and 112 may execute multiple threads so that pixels of the image being rendered can be processed concurrently.

The description below illustrates embodiments of the present invention using a GPU, such as GPU 100. However, it should be apparent that the teachings of this disclosure are applicable to many other types of processors and processing. For example, an embodiment of the present invention is a multi-processor computer having parallelly executing processes for different processing tasks or applications. However, the teachings of this disclosure can be used with particularly advantage in processing environments having a large number of concurrently executing threads such as GPU 100. In single instruction multiple data (SIMD) processing environments, multiple threads execute lockstep in processing a single instruction stream. In executing a stream of instructions, each SIMD processor 111 and 112, for example, executes one or more threads concurrently to process application data. In the description below, the term "wavefront" is used to describe a group of threads. For purposes of clarity, the following description considers a wavefront as a group of threads executing on a single SIMD processor. For example, the wavefront on SIMD processor 111 can include 64 threads, each concurrently processing a separate pixel of the same image. However, embodiments in which a wavefront is spread across multiple processors and embodiments in which multiple wavefronts map to the same processor are also contemplated.

In embodiments of the present invention, SIMD processor block 101 includes one or more thread memory counters to coordinate the memory allocation for threads within each SIMD processor. For the described embodiments, it each wavefront has a separate thread memory counter. For example, SIMD processors 111 and 112 may include thread memory counters 117 and 118, respectively, to use in allocating memory to the respective threads in the wavefront executing in each. The thread memory counter associated with each SIMD processor can, in some embodiments, be implemented as a bit mask or vector having a corresponding bit position for each of a maximum number of threads that may concurrently execute on the associated SIMD processor. If SIMD processor 111 is configured to execute a maximum of 64 concurrent threads, then thread memory counter 117, for example, can be a 64-bit mask, and may be implemented in a register accessible locally to SIMD processor 111. Using a 64-bit mask as thread memory counter 117 enables SIMD processor 111 to keep track of the memory requirements of each concurrent thread. It should be understood that thread memory counter 117, for example, can be implemented as an incrementing counter that can be used to keep track of the memory requirements of each concurrent thread. Thread memory counter 117 can be implemented in a local register of SIMD processor 111. In another embodiment, thread memory counter 117 may be implemented in a general purpose register block (not shown) accessible to all SIMD processors in the SIMD processor block 101. In yet other embodiments, for example, thread memory counter 117 may be implemented elsewhere in the SIMD processor block 101, command processor 103, or memory 107. Each thread memory counter includes functionality to allow atomic access to it for read and write operations. In the description below, each wavefront is considered to have access to a respective thread memory counter.

In another embodiment, SIMD processor block 101 also includes a global memory access coordinator to coordinate the allocation and/or assignment of memory blocks among the SIMD processors. For example, global memory block counter 115 is configured to be accessible by each SIMD processor of the SIMD processor block 101.

In some embodiments, global memory access coordinator 113 can include a wavefront order enforcer 114 and a global memory block counter 115. Wavefront order enforcer 114 includes the functionality to enforce a precedence ordering among wavefronts requesting memory. Global memory block counter 115 can be implemented using a register or memory accessible to the SIMD processors. Global memory block counter 115 includes functionality to allow atomic access for read and write operations.

Command processor 103 includes the functionality to coordinate the functions of GPU 100. For example, command processor 103 can receive graphics instructions from a CPU (not shown) and can issue corresponding instructions for processing by processors in SIMD processing block 101.

In some embodiment of the present invention, command processor 103 can include a wavefront sequencer 121 and/or a wavefront dispatcher 122. Wavefront sequencer 121 includes the functionality to coordinate read/write conflicts between wavefronts. For example, wavefront sequencer 121 can ensure that a wavefront to read certain data is not launched until a wavefront producing (i.e. writing) that data has completed operation. Wavefront dispatcher 122 includes the functionality to launch one or more wavefronts on one or more corresponding SIMD processors. For example, an application instruction received from the CPU can cause command processor 103 to schedule numerous threads to render an image by processing pixels of the image in parallel. Wavefront dispatcher 122 includes functionality to determine how the threads can be grouped into wavefronts such that, for example, each wavefront executes on a separate SIMD processor.

Instruction buffer 105 is a buffer for holding a sequence of instructions to be processed by SIMD processor block 101. For example, command processor 103 enqueues the stream of instructions in instruction buffer 105 from which SIMD processor block 101 takes instructions in sequence for execution. As noted previously, in SIMD environments such as GPU 100, wavefronts executing on SIMD processor 111 and 112 may execute the instruction stream from instruction buffer 105 in sequence.

Data memory 107 can include one or more memory components for use by threads executing in SIMD processor block 101. For example, data memory 107 can include one or more of graphics memory, framebuffer memory, or other memory local to SIMD processor block 101. In yet another embodiment, data memory 107 can include system memory.

Communications infrastructure 109 can include one or more communication buses that provide connectivity between the different components of GPU 100.

Processing of Memory Allocate Requests

Processing that takes place in the SIMD processor block 101 and command processor 103 in relation to the present invention is described below. An overview of system operation may be beneficial. In executing an application, a CPU process will execute instructions from system memory in sequence. When a graphics instruction is encountered, the CPU may provide that instruction to a coupled GPU. The command processor of the GPU parses the instruction and may generate a sequence of instructions to be executed by the SIMD processor block. The sequence of instructions generated by the command processor may be enqueued in an instruction buffer. SIMD processors dequeue instructions from the instruction buffer in sequence. Based on the type of instruction, threads already executing on the SIMD processors may be affected, or new threads may be initiated (launched). Some such threads may require access to memory as writers (i.e., writer threads) to write to memory, or as readers (e.g., reader threads) to read from memory. In the description below, writer threads are allocated memory for writing and reader threads are assigned memory for reading. In the following description, embodiments of the present invention are described primarily in relation to writer threads and memory allocation. However, many of the principles of operation in allocating memory to writer threads are applicable to assigning memory to reader threads.

Memory Allocation for Wavefronts

Figure 2:
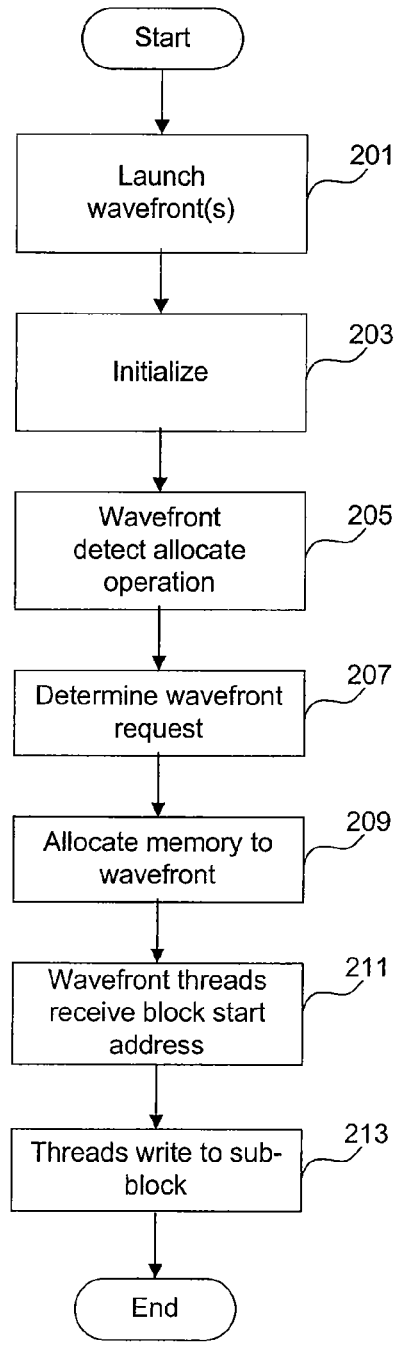
FIG. 2 is a flowchart illustrating processing steps in allocating a memory to a wavefront of writer threads, according to an embodiment of the present invention.

FIG. 2 is a flowchart 200 illustrating the processing steps in allocating memory to a plurality of writer threads according to an embodiment of the present invention. Steps 201-213 can be implemented, for example, in one or more of SIMD processor block 101 and command processor 103, in hardware, firmware and/or software associated with each.

In step 201, one or more wavefronts are launched. In an embodiment, the launching of wavefronts is initiated by command processor 103 issuing instructions to SIMD processors 111 and 112. Wavefront dispatcher 122 can launch the wavefronts in coordination with wavefront sequencer 121 that determines the sequencing of wavefronts, for example, based on application requirements and/or read/write conflicts. In an embodiment, a wavefront identifier may be associated with each wavefront upon launch, where the wavefront identifier represents an ordering of wavefronts related, for example, to a particular application. As described below, in some embodiments, the wavefront identifier can be used to allocate and/or assign memory blocks according to a precedence ordering of the wavefronts. Subsequent to the launch, the wavefronts or more particularly the threads corresponding to the wavefronts, execute concurrently. A wavefront is represented by one of the threads in that wavefront. For example, it may be preconfigured that the first dispatched thread in a wavefront includes the functionality to perform steps 203-209 on behalf of all the threads in the wavefront.

In step 203, the initialization of various values used in coordinating the allocation of memory according to the present invention is done. For example, each of the SIMD processors initializes the thread memory counter (e.g. thread memory counters 117 and 118 associated with SIMD processors 111 and 112, respectively). If more than one wavefront is to be executed, global memory access coordinator 113 is also initialized. In another embodiment, where multiple concurrent memory allocate requests may be pending from a particular thread, each SIMD processor may have a number of thread memory counters corresponding to the maximum number of concurrent memory allocate requests may be pending from a particular thread. Likewise, multiple global memory access coordinators can also be implemented. The global memory block counter can be initialized to the base address of a segment of memory that is pre-allocated by the system to the set of wavefronts.

In step 205, a wavefront detects a request for memory allocation. Within each wavefront, the detection of the request for memory allocation can be based on detecting an instruction requiring an allocation of memory such as, but not limited to, a write instruction. A wavefront is considered to have detected a request for memory allocation when at least one thread in that wavefront has detected a request for memory allocation. In a SIMD environment, however, the same instruction is processed by all threads in a substantially lockstep manner. As noted earlier, although processing the same instruction stream, not all of the concurrent threads will actually require a memory allocation to write to memory. For example, threads processing the same instruction stream may have one set of threads that respond to instructions in one branch, and another set of threads that do not.

Each thread in the wavefront that detects a request for memory allocation, for example, a pending write instruction, accesses functions for having its sub-block (blocks refer to memory allocations for wavefronts and sub-blocks refer to memory allocations for threads) of memory allocated. In the SIMD processing environment of this example, multiple threads are likely to detect a corresponding request for memory allocation at substantially the same time. Having detected that at least one of its constituent threads require a memory allocation, the wavefront then accesses the procedures for obtaining its memory block allocated.

In step 207, each wavefront determines the size of the memory block required for its threads. In this step, each wavefront determines how many of its threads require memory allocations and/or how much of a total memory allocation is required for its threads. An embodiment in which the size of the memory block is determined by a wavefront is described in relation to FIG. 4.

Figure 3:
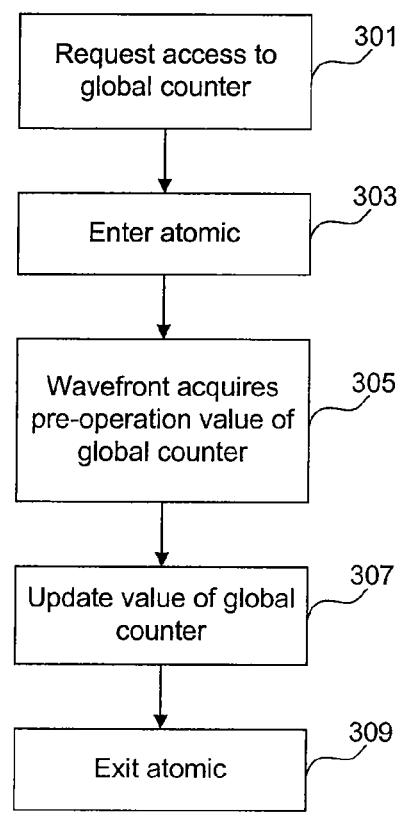
FIG. 3 is a flowchart that shows processing steps in atomically allocating a memory block to a wavefront of writer threads, according to an embodiment of the present invention.

In step 209, a memory block is allocated to a wavefront. The size of the memory block allocated corresponds to, or is based on, the size determined in step 207. Each wavefront is required to perform the memory allocation within an atomic operation in order to avoid conflicts among multiple wavefronts that can potentially request memory allocation at the same time. In this step, each wavefront reserves its memory block and also acquires a starting address for its memory block. FIG. 3 illustrates a method of allocating a memory block to a wavefront, for example, in step 209, according to an embodiment of the present invention.

In step 211, constituent threads of the wavefront receive the starting address of a block of memory allocated to that wavefront. In an embodiment, the first thread representing the wavefront that acquire a block starting address in step 209, makes this value available to other threads of the wavefront. The first thread can write the value to a memory location or register from which other threads of the wavefront can acquire the value.

In step 213, each thread calculates the starting address of its memory sub-block. In an embodiment, a thread calculates its sub-block starting address based on the block starting address acquired in step 209 or 211, a mask count (mask count is described below in relation to FIG. 4) determined in step 207, and a pre-determined stride or sub-block size. Each thread in a wavefront determines a mask count individually. In an embodiment where each thread in a wavefront that requires a memory allocation is allocated sub-blocks of the same size, a thread calculates its sub-block starting address by multiplying its mask count by a pre-determined stride or sub-block size and then adding the resulting value to the block starting address. In another embodiment, instead of the mask count determined in step 209, each thread can determine a relative offset in its wavefront's block in step 209. Determination of the mask count and relative offset is described further in relation to FIG. 4. Each thread in a wavefront that has a request for memory allocation, after determining its sub-block starting address, is ready to write to its allocated memory sub-block.

Steps 205-213 are repeated for each wavefront that detects a memory allocate operation in step 205. As would be clear from the description below elaborating steps of process 200, steps 205-213 enable the allocation of contiguous memory blocks to respective wavefronts launched in step 201. The memory allocated by process 200 is contiguously allocated selectively only to threads that have a pending write to memory. By not indiscriminately allocating memory sub-blocks to all threads regardless of whether each thread requires the allocation based on pending runtime conditions, process 200 results in a substantially improved utilization of available memory. The contiguous nature of the allocated memory for the actual writes also allows more efficient use of scatter write capabilities. Also, in some embodiments, the number of reader threads launched to read data from memory sub-blocks can be configured based on the number of writer threads that actually wrote to sub-blocks.

FIG. 3 is a flowchart illustrating steps 301-309 that implement step 209, according to an embodiment. Steps 305-307 are executed during the time interval in which a particular wavefront is in an atomic operation. In an embodiment, steps 303-309 can be implemented using a primitive operation such as an "add immediate return" operation.

In step 301, a wavefront requests access to update a global memory block counter. As described above in relation to FIG. 1, the global memory block counter is such that at any given time, it reflects the size of the memory currently allocated to wavefronts, such as wavefronts launched in step 203. Upon requesting access to update the global memory block counter, in embodiments in which no specific ordering of wavefronts with respect to memory allocations is desired, the requesting thread is forwarded to processing in step 305 when it is able to acquire atomic access. In embodiments in which it is desired to impose an ordering on wavefronts, the requesting thread may be subject to an additional processing as illustrated in relation to FIG. 5.

There may be multiple wavefronts that requests a memory allocation substantially concurrently. From the multiple requesting wavefronts, the operation of one wavefront (referred to below as the "subject wavefront") is described in the following. In step 303, the subject wavefront acquires access to and enters an atomic operation (i.e., a wavefront atomic operation). From the time the subject wavefront enters the wavefront atomic operation in step 303 to the time it exits the wavefront atomic operation in step 309, other wavefronts are prevented from updating the value of global memory block counter 115. Likewise, read access may also be denies to threads other than the subject thread. The ordering in which threads enter the atomic operation can be determined in any manner. For purposes of description, it is assumed that each thread of the wavefront having a pending request for memory allocation is entered into the atomic operation in the order of detecting the respective request for memory allocation. Any suitable conventional method of providing atomic access to processes, such as the add immediate return operation, can be used in implementing the wavefront atomic operation.

In step 305, the subject wavefront determines the current value of the global memory block counter. In accessing the global memory block counter during the wavefront atomic operation, the subject wavefront reads its current value. The value read by the subject wavefront prior to the update is referred to herein as global memory block counter pre-operation value. As would be clear from the description below, each wavefront receives a different value for the global memory block counter pre-operation value. The global memory block counter pre-operation value obtained by the subject wavefront represents the total memory allocated at the time to wavefronts launched in step 203. The global memory block counter pre-operation value read by the subject wavefront represents, or is used to derive, the starting address for the memory block allocated to the subject wavefront. In one embodiment, at the time of thread launch or initialization, the base address of a memory segment allocated for the application can be communicated to the wavefronts or may be made available in a register accessible to the wavefronts. Each wavefront can then add the value it obtains as the global memory block counter pre-operation value to the base address of the memory segment allocated to the application in order to obtain the starting address of its allocated memory block. The starting memory address for the block allocated for the subject wavefront can then be used by individual threads of the subject wavefront to determine the starting address of their respective memory sub-blocks.

In step 307, the global memory block counter is updated to reflect the allocation of the memory block to the subject wavefront. In an embodiment of the present invention, a message from the subject wavefront can trigger global memory access coordinator 113 to perform the steps of acquiring access to the wavefront atomic operation for the subject wavefront, allocating memory for the subject wavefront, and releasing the subject wavefront from the wavefront atomic operation. The message received from the subject wavefront can include a number of parameters including, for example, the size of the memory block required by the subject wavefront. Having acquired the global block counter pre-operation value, and having updated the global memory block counter, the global memory access coordinator can return the global memory block counter pre-operation value to the subject wavefront. In an embodiment, the global memory access coordinator implements the functionality to acquire and release the wavefront atomic operation for each respective wavefront, and the functionality to access and update the global memory block counter.

The global memory block counter can be implemented as a sequentially incrementing counter that is updated (and read) by each wavefront, or as a function corresponding to each wavefront, using an atomic operation. At any instant in time, therefore, it would represent the total memory currently allocated to threads launched in step 203. Other methods of implementing the global memory block counter, however, are possible. For example, each wavefront may update the global memory block counter with a number of sub-blocks required for its threads where it is known that all sub-blocks are of the same size.

In step 309, the subject wavefront exits the wavefront atomic operation. When the subject wavefront exits the wavefront atomic operation it would have already acquired the starting memory address at which its threads can begin to allocate sub-blocks, and it would have already updated the global memory block counter to reflect the total memory allocated so far for the wavefronts launched in step 203 so that the next wavefront to enter the wavefront atomic operation would receive a starting address for its memory allocation that begins after the memory block allocated to the subject wavefront.

Memory Allocation for Threads within a Wavefront

Figure 4:
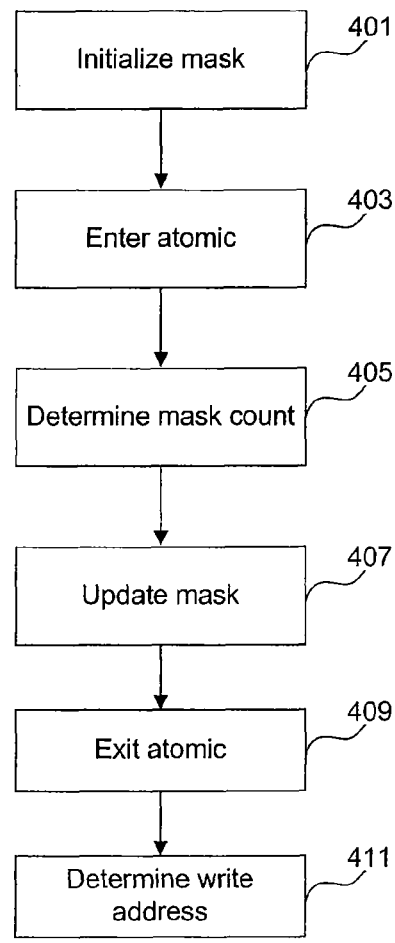
FIG. 4 is a flowchart that shows processing steps in atomically allocating a memory sub-block to a writer thread, according to an embodiment of the present invention.

FIG. 4 is a flowchart illustrating steps 401-411 that, according to an embodiment, is used by each wavefront to determine the size of the memory block required for itself. The size of the block, as determined using steps 401-411, is then used to allocate the memory block as described above in relation to steps 305 and 307, above. Steps 401-411 are executed by each wavefront separately.

In step 401, a thread memory counter is initialized by the subject wavefront. For example, the first thread in the wavefront to detect that it requires a memory allocation initializes the thread memory counter, configures itself to communicate with all other threads of the wavefront, and accesses the global memory block counter through steps 207-209 described above. In an embodiment, the thread memory counter, such as the thread memory counter 117, is implemented as a bit mask of a size corresponding to the maximum number of concurrent threads in the wavefront.

Multiple threads in the wavefront are likely to access the thread memory counter substantially concurrently. Therefore, the reading and updating of the thread memory counter by each constituent thread of the wavefront is controlled by using an atomic operation. The thread level atomic operation is referred to herein as a thread atomic operation.

In step 403, a subject thread accesses the thread atomic operation. As in the case of the wavefront atomic operation, any suitable known means of achieving atomicity can be utilized. The effect of the subject thread entering the thread atomic operation, is that, during that time interval the other threads are excluded from updating (and reading) the thread memory counter.

In step 405, a mask count for the wavefront is determined. The thread memory counter can be implemented as a bitmask. For example, the subject thread can count the number of left most set bits in the bitmask. In another embodiment, each thread is assigned a sequential bit position from the leftmost bit according to the order in which the thread enters the thread atomic operation. In such an embodiment where each thread is assigned a position in the bit mask, the thread reads the number of on bits to the left of its assigned position. The number of set bits in the bitmask is the mask count for the subject thread.

In step 407, the subject thread updates the thread memory counter. When the thread memory counter is a bitmask, in one embodiment the subject thread can set the left most 0 bit to 1. In another embodiment, when each thread in the wavefront acquires a representative bit position, that bit can be set to 1.

When successive threads of a wavefront execute steps 405-407 and the thread memory counter is a bitmask as described, each thread effectively calculates as the mask count the offset (in terms of sub-blocks) in a contiguous memory. When each thread having a pending write operation sets the left most unset bit in the bitmask, it, in effect, reserves the next available contiguous block for it self.

Having determined a mask count in step 405 and having updated the thread memory counter to reflect it's sub-block, the subject thread exits the thread atomic operation in step 409.

In step 411, the subject thread calculates the starting address of its sub-block. The starting address for the sub-block can be determined by multiplying the mask count value by a predetermined sub-block size, and adding the result to the block starting address. This, in effect, completes the allocation of a sub-block in memory for the subject thread in such a manner that contiguous blocks are selectively allocated to threads that have pending memory allocate requests.

The implementation of the thread memory counter as a bitmask, enables a fast and efficient read and update operation. However, in another embodiment, the thread memory counter can be implemented as an incrementing counter. In such an embodiment, the value read by each thread prior to update will still reflect the relative offset of its sub-block. Each thread would then update the thread memory counter by incrementing it by an amount corresponding to the memory allocation of its sub-block. Such an incrementing counter implementation of the thread memory counter can facilitate threads in a wavefront to allocate different sizes of sub-blocks.

Ordering of Memory Allocate Requests

Figure 5:
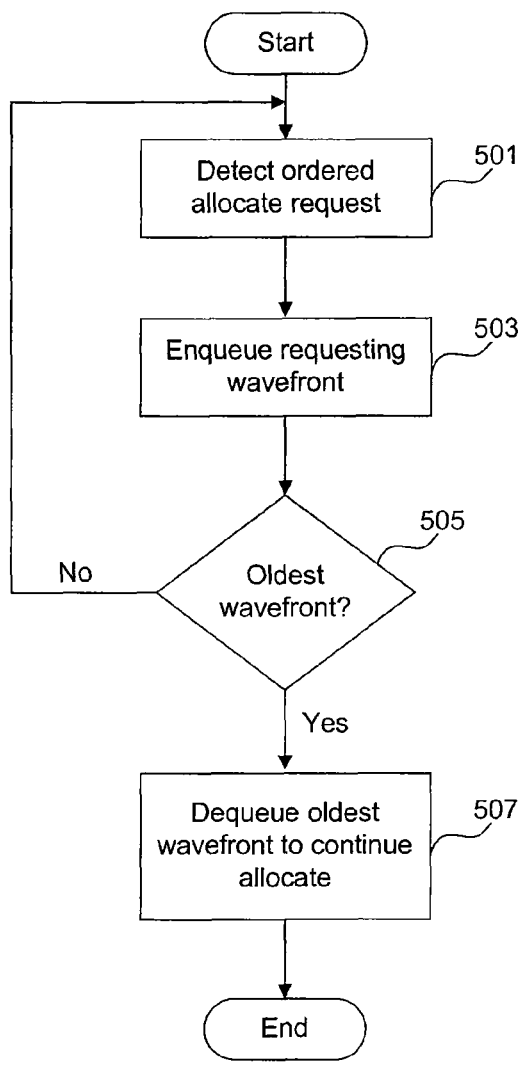
FIG. 5 is a flowchart that shows processing steps in ordering memory allocated requests by writer threads, according to an embodiment of the present invention.

FIG. 5 illustrates the processing steps used when wavefronts require memory allocation according to a predetermined ordering. In step 301, for example, wavefronts may request memory allocation in an order that is not necessarily the ordering in which the command processor launched them, and it may be required or desired to have the memory blocks allocated in sequence according to the wavefront launch order.

Process 500 represents part of the processing in step 301, according to an embodiment of the present invention. In step 501, wavefronts requests access to a global memory block counter such as the global memory block counter 115. The requests are recognized as requests for ordered memory allocation.

In step 503, each requesting wavefront (or the request) is enqueued in a queuing structure that can hold the maximum number of wavefronts that can be concurrently execute in the SIMD processor block 101. In this step, each of the wavefronts that requests a memory allocation is enqueued.

In step 505, the system recognizes when the next oldest expected wavefront is enqueued. Each wavefront that is enqueued, can be ordered according to an sequencing indicator, such as a launch identifier that represents the sequence in which the wavefronts were launched by the command processor. The identification of the oldest wavefront may be accomplished using one of many methods. In one embodiment, each wavefront is enqueued in a queuing structure in a slot corresponding to its respective launch ordering. To recognize when the next oldest expected wavefront enqueues, the corresponding slot in the queuing structure is monitored. When the next oldest is enqueued and then released for further processing, the monitoring slips down to the next slot in sequence, and in this manner ensures the servicing of requests in some predetermined order such as the launch order.

In step 507, the next oldest wavefront (as determined in step 505) is dequeued and proceeds to further processing, such as, step 303 to enter the wavefront atomic operation.

System for Ordering Memory Request

Figure 6:
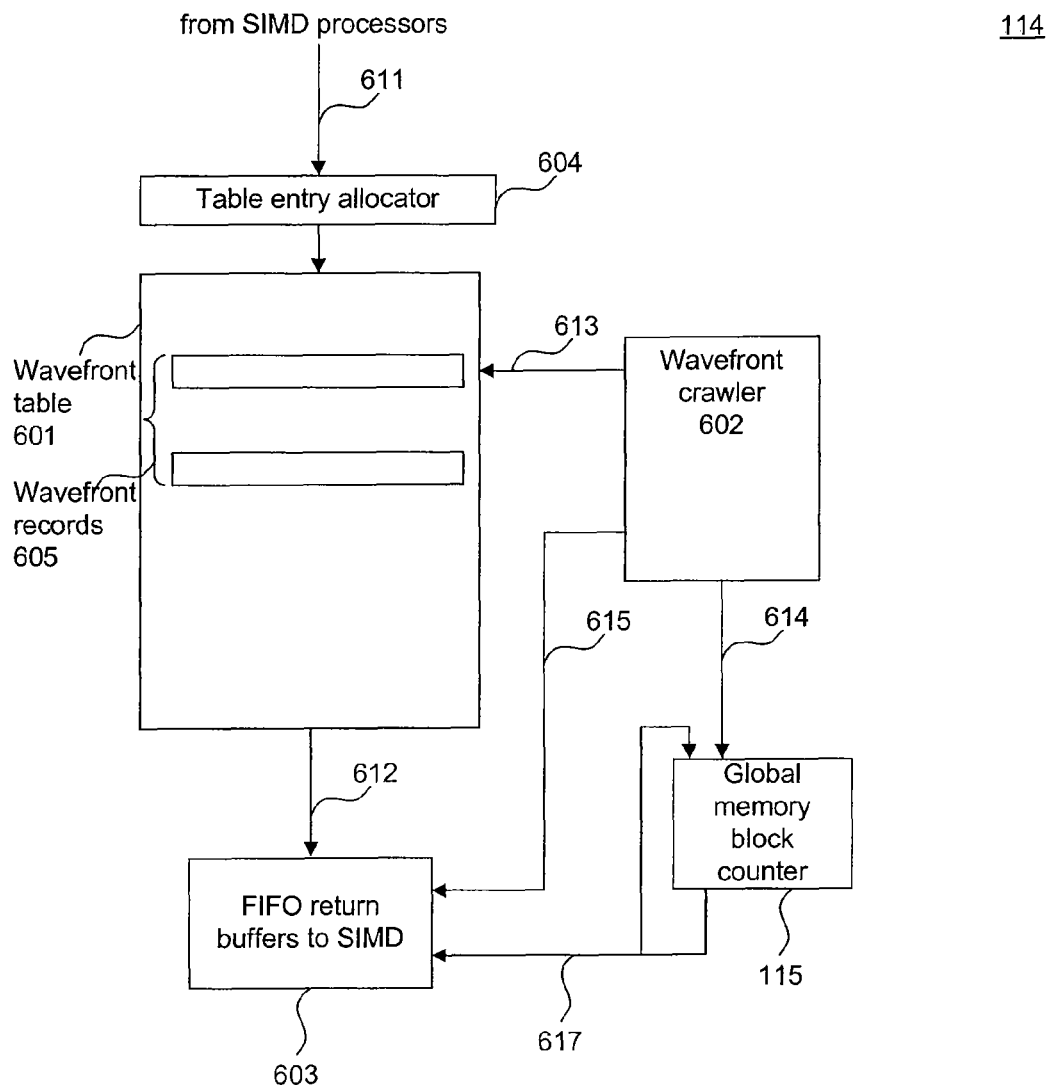
FIG. 6 illustrates a system for ordering memory allocate requests, according to an embodiment of the present invention.

FIG. 6 illustrates a wavefront order enforcer, such as the wavefront order enforcer 114. In an embodiment, wavefront order enforcer 114 implements steps 501-507 to enable the ordering of memory allocate requests. Wavefront order enforcer 114 includes a wavefront table structure 601, a wavefront crawler 602, return buffers to SIMD processors 603, a table entry allocator 604, and access to global memory block counter 115.

Wavefront table 601 holds a set of wavefront records 605. Wavefront table 601 can be a queue or other data structure implemented in registers or other memory. The wavefront table 601 may have pre-allocated slots for wavefront records 605 corresponding to each potential launch identifier.

As requests for memory allocations are received from wavefronts on SIMD processors through interface 611, table entry allocator 604 determines the appropriate location in the wavefront table 601 for the incoming request and enqueues the request to the determined slot. The wavefront record corresponding to the enqueued entry can include wavefront information such as a wavefront identifier, SIMD processor on which it is executing, etc. The record can also include a launch identifier that represents the sequence in which the wavefront was launched by the command processor.

The wavefront crawler 602 continuously monitors wavefront table 601. In one embodiment, the wavefront crawler monitors each ordered slot in the wavefront table in sequence until a valid wavefront record is enqueued to that slot. A wavefront record is valid when any conflicts, such as read/write memory conflicts, related to the memory allocation have been resolved. An interface 613 between wavefront crawler 602 and wavefront table 601 enables the monitoring and selection of wavefront records by the wavefront crawler. Another interface 614 enables wavefront crawler 602 to provide the selected wavefront, or more particularly an identifier such as a corresponding wavefront launch identifier, to the logic for updating global memory block counter 115.

Buffers 603 hold wavefront records 605, or parts thereof, that are selected and/or dequeued from wavefront table 601 according to an ordering that is for example determined by wavefront crawler 602 as described above. The global memory block counter 615, and/or the global memory access coordinator 113, can return the global memory block counter pre-operation value to the subject wavefront on a SIMD processor through buffers 603. An interface 617 between the logic for accessing global memory block counter 115, such as global memory access coordinator 113, and buffers 603 can be used for communicating the global memory block counter pre-operation value. Buffers 603 can be a first-in-first-out (FIFO) from which the wavefront records, or partial wavefront records, along with the corresponding global memory block counter pre-operation value, can be retrieved for processing by a SIMD processor. For example, wavefronts can obtain the global memory block counter pre-operation value through buffers 603. Interfaces 612 and 615, from wavefront table 601 and wavefront crawler 602 respectively, enable the enqueueing of selected wavefront records or partial wavefront records to buffers 603.

Assigning Memory to Wavefronts

FIGS. 7-10 describe memory assignment to reader wavefronts and reader threads, corresponding to the memory allocation described in relation to FIGS. 2-5 above. Many of the concepts remain the same in assigning blocks and sub-blocks of memory to readers, as in allocating to writers.

Figure 7:
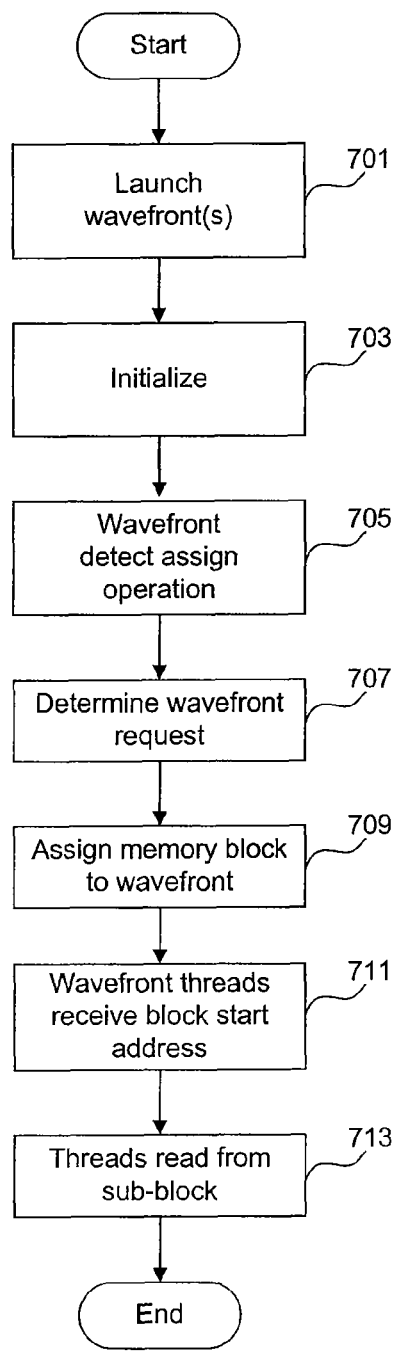
FIG. 7 is a flowchart illustrating processing steps in assigning a memory to a wavefront of reader threads, according to an embodiment of the present invention.

FIG. 7 is a flowchart 700 illustrating the processing steps in assigning memory to a plurality of reader threads according to an embodiment of the present invention. Steps 701-713 can be implemented, for example, in one or more of SIMD processor block 101 and command processor 103, in hardware, firmware and/or software associated with each.

In step 701, one or more wavefronts are launched. In an embodiment, the launching of wavefronts is initiated by command processor 103 issuing instructions to SIMD processors 111 and 112. Wavefront dispatcher 122 can launch the wavefronts in coordination with wavefront sequencer 121 that determines the sequencing of wavefronts, for example, based on application requirements and/or read/write conflicts. In an embodiment, a wavefront identifier may be associated with each wavefront upon launch, where the wavefront identifier represents an ordering of wavefronts related, for example, to a particular application. As described below, in some embodiments, the wavefront identifier can be used to allocate and/or assign memory blocks according to a precedence ordering of the wavefronts. Subsequent to the launch, the wavefronts or more particularly the threads corresponding to the wavefronts, execute concurrently. A wavefront is represented by one of the threads in that wavefront. For example, it may be preconfigured that the first dispatched thread in a wavefront includes the functionality to perform steps 703-709 on behalf of all the threads in the wavefront.

In step 703, the initialization of various values used in coordinating the assignment of memory according to the present invention is done. For example, each of the SIMD processors initializes the thread memory counter (e.g. thread memory counters 117 and 118 associated with SIMD processors 111 and 112, respectively). If more than one wavefront is to be executed, global memory access coordinator 113 is also initialized. In another embodiment, where multiple concurrent memory assign requests may be pending from a particular thread, each SIMD processor may have a number of thread memory counters corresponding to the maximum number of concurrent memory assign requests may be pending from a particular thread. Likewise, multiple global memory access coordinators can also be implemented. The global memory block counter can be initialized to the base address of a segment of memory that is assigned by the system to the set of wavefronts.

In step 705, a wavefront detects a request for memory assignment. Within each wavefront, the detection of the request for memory assignment can be based on detecting an instruction requiring an assignment of memory such as, but not limited to, a write instruction. A wavefront is considered to have detected a request for memory assignment when at least one thread in that wavefront has detected a request for memory assignment. In a SIMD environment, however, the same instruction is processed by all threads in a substantially lockstep manner. As noted earlier, although processing the same instruction stream, not all of the concurrent threads will actually require a memory assignment to read from memory. For example, threads processing the same instruction stream may have one set of threads that respond to instructions in one branch, and another set of threads that do not.

Each thread in the wavefront that detects a request for memory assignment, for example, a pending read instruction, accesses functions for having its sub-block of memory assigned. In the SIMD processing environment of this example, multiple threads are likely to detect a corresponding request for memory assignment at substantially the same time. Having detected that at least one of its constituent threads require a memory assignment, the wavefront then accesses the procedures for obtaining its memory block assigned.

In step 707, each wavefront determines the size of the memory block required for its threads. In this step, each wavefront determines how many of its threads require memory assignments and/or how much of a total memory assignment is required for its threads. An embodiment in which the size of the memory block is determined by a wavefront is described in relation to FIG. 9.

Figure 8:
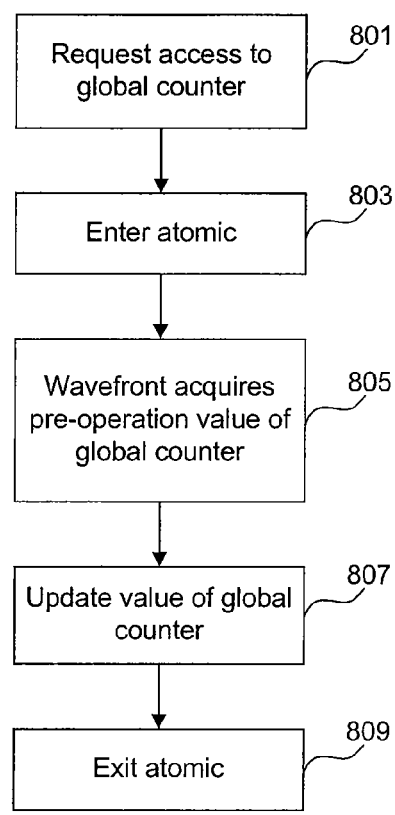
FIG. 8 is a flowchart showing processing steps in atomically assigning a memory block to a wavefront of reader threads, according to an embodiment of the present invention.

In step 709, a memory block is assigned to a wavefront. The size of the memory block assigned corresponds to, or is based on, the size determined in step 707. Each wavefront is required to perform the memory assignment to itself within an atomic operation in order to avoid conflicts among multiple wavefronts that can potentially request memory assignments at the same time. In this step, each wavefront reserves its memory block and also acquires a starting address for its memory block. FIG. 8 illustrates a method of assigning a memory block to a wavefront, for example, in step 709, according to an embodiment of the present invention.

In step 711, constituent threads of the wavefront receive the starting address of a block of memory assigned to that wavefront. In an embodiment, the first thread representing the wavefront that acquire a block starting address in step 709, makes this value available to other threads of the wavefront. The first thread can write the value to a memory location or register from which other threads of the wavefront can acquire the value.

In step 713, each thread calculates the starting address of its memory sub-block. In an embodiment, a thread calculates its sub-block starting address based on the block starting address acquired in step 709 or 711, a mask count (mask count is described below in relation to FIG. 8) determined in step 707, and a pre-determined stride or sub-block size. Each thread in a wavefront determines a mask count individually. In an embodiment where each thread in a wavefront that requires a memory assignment is assigned sub-blocks of the same size, a thread calculates its sub-block starting address by multiplying its mask count by a pre-determined stride or sub-block size and then adding the resulting value to the block starting address. In another embodiment, instead of the mask count determined in step 709, each thread can determine a relative offset in its wavefront's block in step 709. Determination of the mask count and relative offset is described further in relation to FIG. 8. Each thread in a wavefront that has a request for memory assignment, after determining its sub-block starting address, is ready to read to its assigned memory sub-block.

Steps 705-713 are repeated for each wavefront that detects a memory assign operation in step 705. As would be clear from the description below elaborating steps of process 700, steps 705-713 enable the assignment of contiguous memory blocks to respective wavefronts launched in step 701. The memory assigned by process 700 is contiguously assigned selectively only to threads that have a pending read from memory.

FIG. 8 is a flowchart illustrating steps 801-809 that implement step 709, according to an embodiment. Steps 805-807 are executed during the time interval in which a particular wavefront is in an atomic operation. In an embodiment, steps 803-809 can be implemented using a primitive operation such as an "add immediate return" operation.

In step 801, a wavefront requests access to update a global memory block counter. As described above in relation to FIG. 1, the global memory block counter is such that at any given time, it reflects the size of the memory currently assigned to wavefronts, such as wavefronts launched in step 703. Upon requesting access to update the global memory block counter, in embodiments in which no specific ordering of wavefronts with respect to memory assignment is desired, the requesting thread is forwarded to processing in step 805 when it is able to acquire atomic access. In embodiments in which it is desired to impose an ordering on wavefronts, the requesting thread may be subject to an additional processing as illustrated in relation to FIG. 10.

There may be multiple wavefronts that requests a memory assignment substantially concurrently. From the multiple requesting wavefronts, the operation of one wavefront (referred to below as the "subject reader wavefront") is described in the following. In step 803, the subject reader wavefront acquires access to and enters an atomic operation (i.e., a wavefront atomic operation). From the time the subject reader wavefront enters the wavefront atomic operation in step 803 to the time it exits the wavefront atomic operation in step 809, other wavefronts are prevented from updating and or reading the value of global memory block counter 115. The ordering in which threads enter the atomic operation can be determined in any manner. For purposes of description, it is assumed that each thread of the wavefront having a pending request for memory assignment is entered into the atomic operation in the order of detecting the respective request for memory assignment. Any suitable conventional method of providing atomic access to processes, such as the add immediate return operation, can be used in implementing the wavefront atomic operation.

In step 805, the subject reader wavefront determines the current value of the global memory block counter. In accessing the global memory block counter during the wavefront atomic operation, the subject reader wavefront reads its current value. The value read by the subject reader wavefront prior to the update is referred to herein as global memory block counter pre-operation value. As would be clear from the description below, each wavefront receives a different value for the global memory block counter pre-operation value. The global memory block counter pre-operation value obtained by the subject reader wavefront represents the total memory assigned at the time to wavefronts launched in step 203. The global memory block counter pre-operation value read by the subject reader wavefront represents, or is used to derive, the starting address for the memory block assigned to the subject reader wavefront. In one embodiment, at the time of thread launch or initialization, the base address of a memory segment assigned for the application can be communicated to the wavefronts or may be made available in a register accessible to the wavefronts. Each wavefront can then add the value it obtains as the global memory block counter pre-operation value to the base address of the memory segment assigned to the application in order to obtain the starting address of its assigned memory block. The starting memory address for the block assigned for the subject reader wavefront can then be used by individual threads of the subject reader wavefront to determine the starting address of their respective memory sub-blocks.

In step 807, the global memory block counter is updated to reflect the assignment of the memory block to the subject reader wavefront. In an embodiment of the present invention, a message from the subject reader wavefront can trigger global memory access coordinator 113 to perform the steps of acquiring access to the wavefront atomic operation for the subject reader wavefront, assigning memory for the subject reader wavefront, and releasing the subject reader wavefront from the wavefront atomic operation. The message received from the subject reader wavefront can include a number of parameters including, for example, the size of the memory block required by the subject reader wavefront. Having acquired the global block counter pre-operation value, and having updated the global memory block counter, the global memory access coordinator can return the global memory block counter pre-operation value to the subject reader wavefront. In an embodiment, the global memory access coordinator implements the functionality to acquire and release the wavefront atomic operation for each respective wavefront, and the functionality to access and update the global memory block counter.

The global memory block counter can be implemented as a sequentially incrementing counter that is updated (and read) by each wavefront, or as a function corresponding to each wavefront, using an atomic operation. At any instant in time, therefore, it would represent the total memory currently assigned to threads launched in step 703. Other methods of implementing the global memory block counter, however, are possible. For example, each wavefront may update the global memory block counter with a number of sub-blocks required for its threads where it is known that all sub-blocks are of the same size.

In step 809, the subject reader wavefront exits the wavefront atomic operation. When the subject reader wavefront exits the wavefront atomic operation it would have already acquired the starting memory address at which its threads can begin to assigned sub-blocks, and it would have already updated the global memory block counter to reflect the total memory assigned so far for the wavefronts launched in step 703 so that the next wavefront to enter the wavefront atomic operation would receive a starting address for its memory assignment that begins after the memory block assigned to the subject reader wavefront.

Memory Assignment for Reader Threads within a Wavefront

Figure 9:
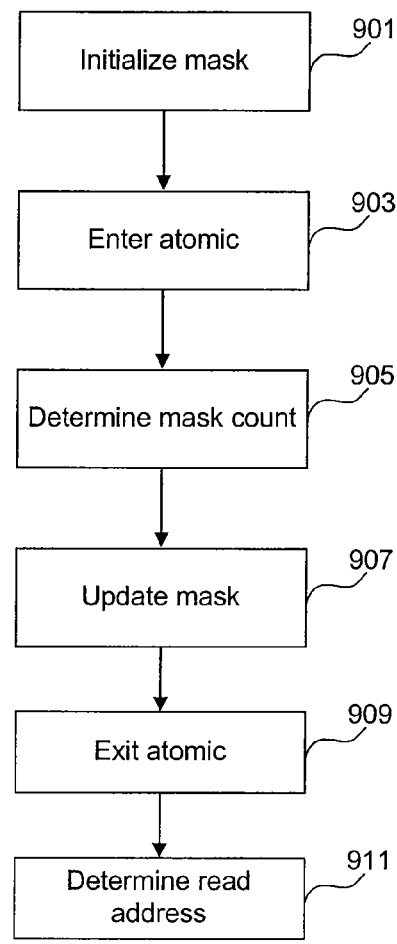
FIG. 9 is a flowchart showing processing steps in atomically assigning a memory sub-block to a reader thread, according to an embodiment of the present invention.

FIG. 9 is a flowchart illustrating steps 901-911 that, according to an embodiment, is used by each wavefront to determine the size of the memory block required for itself. The size of the block, as determined using steps 901-911, is then used to assign the memory block as described above in relation to steps 805 and 807, above. Steps 901-911 are executed by each wavefront separately.

In step 901, a thread memory counter is initialized by the subject reader wavefront. For example, the first thread in the wavefront to detect that it requires a memory assignment initializes the thread memory counter, configures itself to communicate with all other threads of the wavefront, and accesses the global memory block counter through steps 707-709 described above. In an embodiment, the thread memory counter, such as the thread memory counter 117, is implemented as a bit mask of a size corresponding to the maximum number of concurrent threads in the wavefront.

Multiple threads in the wavefront are likely to access the thread memory counter substantially concurrently. Therefore, the reading and updating of the thread memory counter by each constituent thread of the wavefront is controlled by using an atomic operation. The thread level atomic operation is referred to herein as a thread atomic operation.

In step 903, a subject thread accesses the thread atomic operation. As in the case of the wavefront atomic operation, any suitable known means of achieving atomicity can be utilized. The effect of the subject thread entering the thread atomic operation, is that, during that time interval the other threads are excluded from updating (and reading) the thread memory counter.

In step 905, a mask count for the wavefront is determined. The thread memory counter can be implemented as a bitmask. For example, the subject thread can count the number of left most set bits in the bitmask. In another embodiment, each thread is assigned a sequential bit position from the leftmost bit according to the order in which the thread enters the thread atomic operation. In such an embodiment where each thread is assigned a position in the bit mask, the thread reads the number of on bits to the left of its assigned position. The number of set bits in the bitmask is the mask count for the subject thread.

In step 907, the subject thread updates the thread memory counter. When the thread memory counter is a bitmask, in one embodiment the subject thread can set the left most 0 bit to 1. In another embodiment, when each thread in the wavefront acquires a representative bit position, that bit can be set to 1.

When successive threads of a wavefront execute steps 905-907 and the thread memory counter is a bitmask as described, each thread effectively calculates as the mask count the offset (in terms of sub-blocks) in a contiguous memory. When each thread having a pending read operation sets the left most unset bit in the bitmask, it, in effect, reserves the next available contiguous block for it self.

Having determined a mask count in step 905 and having updated the thread memory counter to reflect it's sub-block, the subject thread exits the thread atomic operation in step 909.

In step 911, the subject thread calculates the starting address of its sub-block. The starting address for the sub-block can be determined by multiplying the mask count value by a predetermined sub-block size, and adding the result to the block starting address. This, in effect, completes the assignment of a sub-block in memory for the subject thread in such a manner that contiguous blocks are selectively assigned to threads that have pending memory assign requests.

Ordering of Memory Assignment Requests

Figure 10:
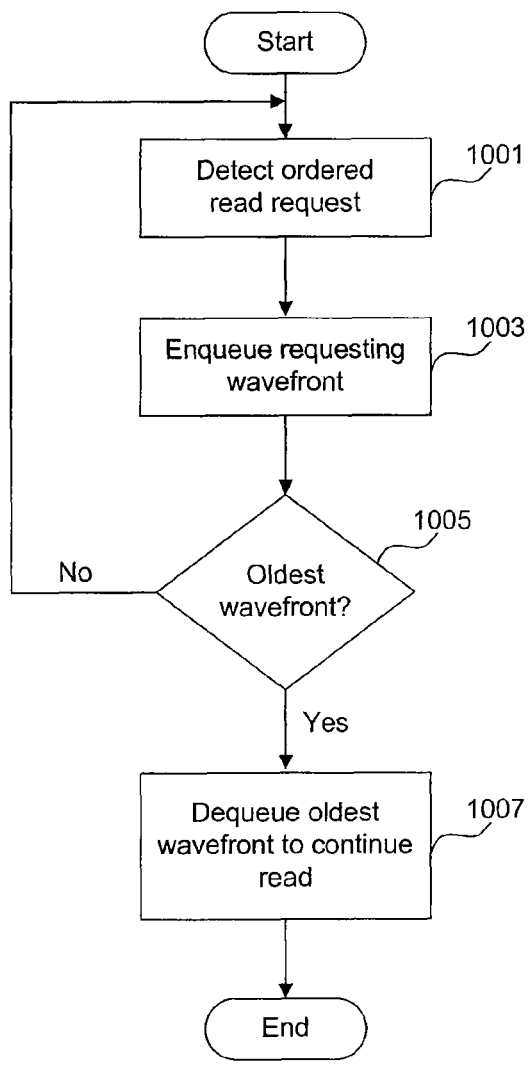
FIG. 10 is a flowchart showing processing steps in ordering memory assignment requests by wavefronts of reader threads, according to an embodiment of the present invention.

FIG. 10 illustrates the processing steps used when wavefronts require memory assignment according to a predetermined ordering. In step 801, for example, wavefronts may request memory assignment in an order that is not necessarily the ordering in which the command processor launched them, and it may be required or desired to have the memory blocks assigned in sequence according to the wavefront launch order.

Process 1000 represents part of the processing in step 801, according to an embodiment of the present invention. In step 1001, wavefronts requests access to a global memory block counter such as the global memory block counter 115. The requests are recognized as requests for ordered memory assignment.

In step 1003, each requesting wavefront (or the request) is enqueued in a queuing structure that can hold the maximum number of wavefronts that can be concurrently execute in the SIMD processor block 101. In this step, each of the wavefronts that requests a memory assignment is enqueued.

In step 1005, the system recognizes when the next oldest expected wavefront is enqueued. Each wavefront that is enqueued, can be ordered according to an sequencing indicator, such as a launch identifier that represents the sequence in which the wavefronts were launched by the command processor. The identification of the oldest wavefront may be accomplished using one of many methods. In one embodiment, each wavefront is enqueued in a queuing structure in a slot corresponding to its respective launch ordering. To recognize when the next oldest expected wavefront enqueues, the corresponding slot in the queuing structure is monitored. When the next oldest is enqueued and then released for further processing, the monitoring slips down to the next slot in sequence, and in this manner ensures the servicing of requests in some predetermined order such as the launch order.

In step 1007, the next oldest wavefront (as determined in step 1005) is dequeued and proceeds to further processing, such as, step 803 to enter the wavefront atomic operation.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the invention as described herein. Embodiments may also, include computer readable media storing computer programs describing the embodiments described above.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   dynamically determining, from a plurality of concurrent threads, writer threads each having at least one pending write to a memory;
   sequentially entering the writer threads into an atomic operation; and
   dynamically allocating respective blocks in the memory to corresponding ones of the writer threads that have entered the atomic operation, wherein each of the allocated respective blocks is contiguous to other ones of the allocated respective blocks.

2. The method of claim 1, wherein said dynamically allocating comprises:
   reading, during the atomic operation sequentially entered by a corresponding one of the writer threads, a thread memory counter to obtain a pre-operation value;
   updating, during the atomic operation sequentially entered by the corresponding one of the writer threads, the thread memory counter to indicate allocation of a block of said memory to the corresponding one of the writer threads; and
   calculating a write address for the corresponding one of the writer threads based on the pre-operation value.

3. A method, comprising:
   launching a plurality of threads as a plurality of wavefronts;
   dynamically determining, from the plurality of wavefronts, a group of wavefronts each having at least one thread requiring a write to a memory;
   sequentially entering wavefronts from the group of wavefronts into an atomic operation; and
   dynamically allocating respective blocks in the memory to corresponding ones of the wavefronts that have entered the atomic operation, wherein each of the allocated respective blocks is contiguous to other ones of the allocated respective blocks.

4. The method of claim 3, wherein said launching comprises:
   detecting, in each one of said group of wavefronts, at least one thread having a pending memory allocate instruction.

5. The method of claim 3, wherein said dynamically allocating comprises:
   allocating during the atomic operation sequentially entered by a first wavefront from the group of wavefronts a first block in the memory to the first wavefront, wherein the first block is contiguous to a previously allocated block dynamically allocated to another one of said group of wavefronts.

6. The method of claim 5, wherein said allocating a first block comprises:
   reading a pre-operation value of a global memory block counter;
   determining the size of the first block;
   determining a base address for the first block in said memory based on parameters including the pre-operation value; and
   updating the global memory block counter based on the size of the first block and the base address,
   wherein said reading, said determining the size of the first block, said determining a base address, and said updating the global memory are performed during the atomic operation.

7. The method of claim 6, wherein the determining the size of the first block comprises:
   initializing a thread memory counter;
   processing the thread memory counter by respective threads of the first one of the group of wavefronts;
   determining a contributor count based on the processed thread memory counter, wherein the contributor count represents a number of said threads that request allocations of said memory; and
   computing the size of the first block based on parameters including the contributor count.

8. The method of claim 7, wherein the processing the thread memory counter comprises:
   determining a write address in said memory for each thread in the first one of the group of wavefronts; and
   updating of the thread memory counter by said each thread.

9. The method of claim 8, wherein the determining a write address comprises:
   entering a first one of said each thread to a second atomic operation;
   reading, during the second atomic operation, the contributing thread memory counter to obtain a second pre-operation value;
   updating, during the second atomic operation, the contributing thread memory counter to a second post-operation value to indicate allocation of a sub-block of said memory to the first one of said each thread; and
   calculating a write address for the first thread based on the second pre-operation value.

10. The method of claim 3, wherein said sequentially entering comprises:
    identifying a first wavefront having the highest precedence according to a precedence ordering of said group of wavefronts, wherein the first wavefront has not been allocated a block in said memory.

11. The method of claim 10, wherein the identifying a first wavefront comprises:
    enqueuing respective ones of said group of wavefronts in a request queue; and
    dequeuing the first wavefront from the request queue according to the precedence ordering.

12. The method of claim 3, wherein said sequentially entering comprises:
    enqueuing respective ones of said group of wavefronts in a request queue;

dequeuing a first wavefront according to a precedence ordering; and entering the first wavefront from said group of wavefronts to the atomic operation.

13. A processor comprising:

at least one data-parallel thread processor configured to execute a plurality of concurrent threads; and a compact memory allocator, configured to:

dynamically determine, from the plurality of concurrent threads, writer threads each having at least one pending write to a memory;

sequentially enter the writer threads into an atomic operation; and dynamically allocate respective blocks in the memory to corresponding ones of the writer threads that have entered the atomic operation, wherein each of the allocated respective blocks is contiguous to other ones of the allocated respective blocks.

14. The processor of claim 13, further comprising:

at least one thread memory counter coupled to the at least one data-parallel thread. processor, wherein said respective blocks in the memory for each of the writer threads are dynamically allocated using the at least one thread memory counter.

15. The processor of claim 13, further comprising:

a global memory block counter coupled to the at least one data-parallel thread processor; and wherein the compact memory allocator is further configured to:

dynamically determine, from a plurality of wavefronts, a group of wavefronts each having at least one thread requiring a write to the memory; and sequentially enter wavefronts from the group of wavefronts into an atomic operation; and dynamically allocate, using the global memory block counter, respective blocks in the memory to corresponding ones of the wavefronts that have entered the atomic operation, wherein each of the allocated respective blocks is contiguous to other ones of the allocated respective blocks.

16. The processor of claim 15, further comprising:

a wavefront order enforcer configured to:

identify a first wavefront having the highest precedence according to a precedence ordering of said group of wavefronts, and wherein the first wavefront has not been allocated a block in said memory;

wherein the compact memory allocator is further configured to:

enter the first wavefront to the atomic operation; and allocate a first block in the memory to the first wavefront during the atomic operation, wherein the first block is contiguous to a previously allocated block dynamically allocated to another wavefront from said group of wavefronts.

17. The processor of claim 16, wherein the wavefront order enforcer comprises:

a wavefront table configured to:

enqueue respective ones of said group of wavefronts in a request queue; and dequeue a first wavefront according to the precedence ordering;

a wavefront crawler configured to:

determine the first wavefront according to the precedence ordering.

18. A non-transitory computer readable storage medium storing instructions wherein said instructions when executed are adapted to allocate a memory to a plurality of concurrent threads, by comprising:

dynamically determining, from the plurality of concurrent threads, writer threads each having at least one pending write to the memory;

sequentially entering the writer threads into an atomic operation; and dynamically allocating respective blocks in the memory to corresponding ones of the writer threads that have entered the atomic operation, wherein each of the allocated respective blocks is contiguous to other ones of the allocated respective blocks.

19. A non-transitory computer readable storage medium storing instructions wherein said instructions when executed are adapted to allocate a memory to a plurality of concurrent threads, by comprising:

launching the plurality of threads as a plurality of wavefronts;

dynamically determining; from the plurality of wavefronts, a group of wavefronts each having at least one thread requiring a write to the memory;

sequentially entering wavefronts from the group of wavefronts into an atomic operation; and dynamically allocating respective blocks in the memory to corresponding ones of the wavefronts that have entered the atomic operation, wherein each of the allocated respective blocks is contiguous to other ones of the allocated respective blocks.

* * * * *